(No Model.)

I. N. GREGG & E. BRIODY.
TAP AND FAUCET.

No. 279,745. Patented June 19, 1883.

Witnesses,
Geo. H. Strong.
S. H. Nourse.

Inventors,
Isaac N. Gregg and
Edward Briody
By Dewey & Co.
Attorneys

UNITED STATES PATENT OFFICE.

ISAAC N. GREGG AND EDWARD BRIODY, OF SANTA CRUZ, CALIFORNIA; SAID GREGG ASSIGNOR OF ONE-HALF HIS RIGHT TO THOMAS BRADY, OF SANTA CRUZ COUNTY, CALIFORNIA.

TAP AND FAUCET.

SPECIFICATION forming part of Letters Patent No. 279,745, dated June 19, 1883.

Application filed August 5, 1882. (No model.)

*To all whom it may concern:*

Be it known that we, ISAAC N. GREGG and EDWARD BRIODY, of Santa Cruz, county of Santa Cruz, State of California, have invented an Improved Tap and Faucet; and we hereby declare the following to be a full, clear, and exact description thereof.

Our invention relates to a new and useful tap and faucet; and it consists in a pipe or tap screwed permanently into the vessel, and provided with vents or ports at its rear end. Within this end is screwed a solid plug, the threads of which, when under the ports, close them, but when moved back open them, so that the liquid may find an escape by the smooth portion of the plug, which is of sufficiently smaller diameter to form such a passage. This plug is operated by a faucet the end of which is provided with a mortise. The faucet screws into the tap and engages with a tenon upon the end of a plug, said tenon only reaching into the mortise far enough to leave a passage through the latter into the faucet, as will hereinafter fully appear.

The object of our invention is to furnish an effective tap and faucet, and one in which the parts are not liable to bind or otherwise get out of order.

Figure 1:
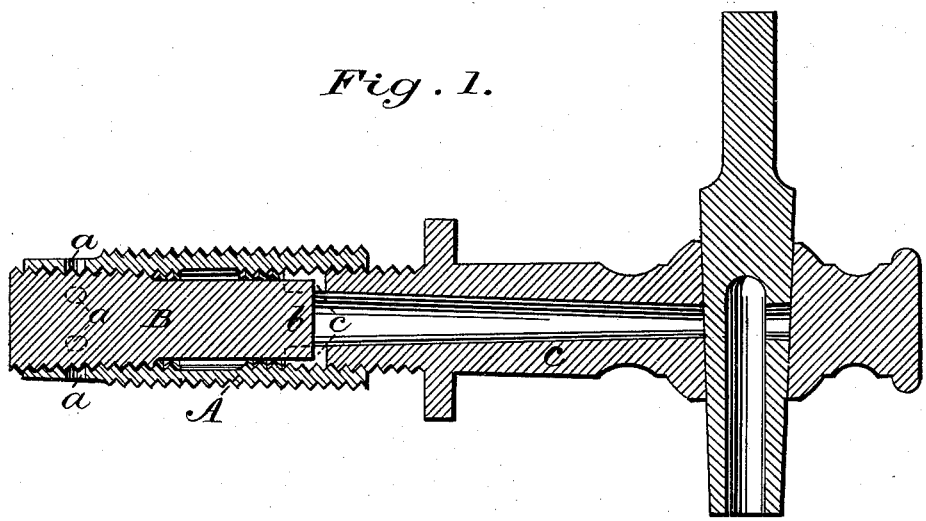
Figure 2:
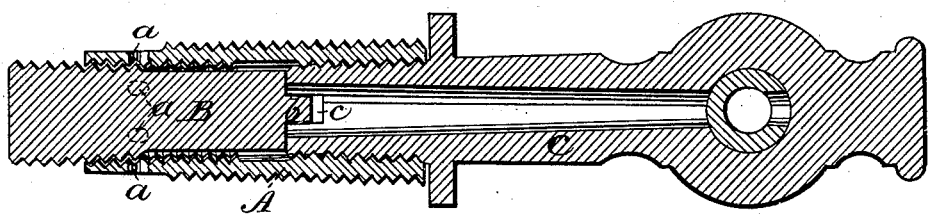
Figure 3:
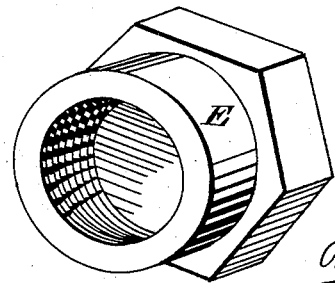

Referring to the accompanying drawings, Figure 1 is a longitudinal section through our tap and faucet preparatory to entering a cask. Fig. 2 is a horizontal section of our tap and faucet in position as it would be after entering a cask. Fig. 3 is a perspective view of the cap.

Let A represent the tap. This is a piece of pipe provided with threads upon its outer surface, adapting it to be screwed into suitable bushing and permanently secured in the keg or cask. It has small apertures or ports $a$ upon its rear end.

B represents a solid plug. Its rear end is threaded, and is adapted to screw into the rear end of the tap a sufficient distance beyond the ports $a$ to completely close them. Forward of the ends the plug is smooth, and is smaller than the inside of the tap, leaving a passage around it. It is provided with a tenon, $b$, at its forward end.

C represents the faucet. It is an ordinary faucet in most respects. Its rear end is threaded, and is adapted to screw into the forward or outer end of tap A. It has a mortise, $c$, as shown, which, when the faucet is screwed into the tap, is adapted to engage with the tenon $b$ of the plug, and thus to screw said plug forward or back. The mortise does not fit completely over the tenon, so that, while sufficient to turn it, small ports or spaces are left in the mortise, through which the liquid which flows forward around the plug may escape into the faucet.

The operation of the device is as follows: The tap being in place and the plug B screwed forward to close the ports $a$, the faucet is inserted in the outer end of the tap and at once engages its mortise with the tenon of the plug, which is made long enough for this purpose. Now, by screwing the faucet in, the plug is screwed back until its threaded portion gets beyond the ports $a$, when the liquid will flow through, and, passing around the smooth portion of the plug, escape through the mortise into the faucet. When we wish to close the tap we screw the faucet forward—that is, unscrew it. This returns the plug until its threaded portion closes the ports. Thus the faucet and plug are dependent upon each other. When engaged they cannot be separated until the tap is closed, for when the tap is open the plug is screwed back and the faucet is screwed in some distance. In this position it cannot be removed from the tap without returning the plug and closing the ports. Therefore the faucet can only be removed when the tap is shut off, and the tap cannot be opened except by the faucet.

For safety in transportation we have a cap, E, adapted to screw over the outer end of the tap, and thus protect it.

When the kegs have to be pitched the tap may be removed from the bushing and returned when the operation is complete, thus avoiding the closing of the ports.

Having thus described our invention, what we claim as new, and desire to secure by Letters Patent, is—

1. The tap A, adapted to be screwed into the vessel, and having ports or vents *a* at its inner end, in combination with the solid plug B, having a threaded rear portion adapted to screw into tap A and close the ports *a*, and a smooth forward portion small enough to leave a passage or space between it and the tap, and a means for screwing said plug forward to close the ports with the threaded end and backward to open them with the smooth end, substantially as herein described.

2. The tap A, screwed into the vessel and having ports or vents *a* at its inner end, and the solid plug B, having a threaded rear portion and a smooth forward portion small enough to leave a passage or space between it and the tap, and having a tenon, *b*, on its forward end, in combination with the faucet C, having a threaded end adapted to screw within the outer end of the tap, and a mortise, *c*, for engaging with the tenon *b* of the plug to screw it in or out, substantially as herein described.

In witness whereof we hereunto set our hands.

ISAAC N. GREGG.
EDWARD BRIODY.

Witnesses:
I. D. CHACE,
GEORGE CARTER.